United States Patent Office 3,344,155
Patented Sept. 26, 1967

3,344,155
HALOGENATED 8,8,8-TRIPHENYLPROPYL-
AMINE COMPOUNDS
Manfred Schorr and Rudolf Fussgänger, Frankfurt am
Main, Fritz Bauer, Bad Soden, Taunus, and Georg
Nesemann, Frankfurt am Main, Germany, assignors to
Farbwerke Hoechst Aktiengesellschaft vormals Meister
Lucius & Brüning, Frankfurt am Main, Germany, a corporation of Germany
No Drawing. Filed Dec. 1, 1961, Ser. No. 156,500
6 Claims. (Cl. 260—389)

The present invention relates to tertiary and quaternary diethanolamines characterized by bactericidal and fungicidal properties. It likewise relates to pharmaceutical preparations showing bactericidal and fungicidal activity and containing the above-mentioned substances as active ingredients.

We have found that tertiary diethanolamines and their quarternary ammonium salts are obtained by reacting primary amines corresponding to the general formula

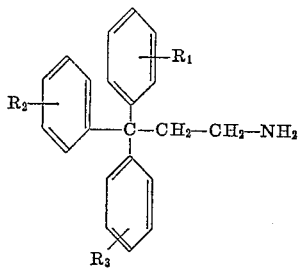

in which $R_1$, $R_2$ and $R_3$ represent hydrogen or halogen atoms with ethylene-chlorohydrin or with ethylene-oxide and causing a reactive ester of an alcohol of the general formula

$$R_4—OH$$

in which $R_4$ represents an alkyl radical, a hydroxy-alkyl radical of low molecular weight, an alkylene radical or a benzyl radical which may be substituted by halogen atoms, to act on the amines formed and corresponding to the formula

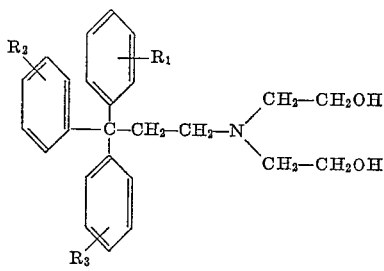

in which $R_1$, $R_2$ and $R_3$ have the meanings given above.

As starting substances there may be used the following amines:

γ,γ,γ-tri-(4'-chlorophenyl)-propylamine,
γ-phenyl-γ,γ-bis-(4'-chlorophenyl)-propylamine,
γ-(3'-chlorophenyl)-γ,γ-bis-(4'-chlorophenyl)-propylamine,
γ-(3'-fluorophenyl)-γ,γ-bis-(4'-chlorophenyl)-propylamine,
γ,γ-bis-(4'-fluorophenyl)-γ-(4-chlorophenyl)-propylamine,
γ-(3',4'-dichlorophenyl)-γ,γ-bis-(4'-chlorophenyl)-propylamine.

These primary amines can be prepared in a simple manner by heating under reflux triphenyl-carbinols with cyanoacetic acid in the presence of low-molecular aliphatic carboxylic acid and a salt of a metal of the sub group of the second group of the Periodic System and hydrogenating catalytically the β,β,β-triphenyl-proprionitrile that has formed.

The process according to the invention is realized by reacting the primary amine with ethylene-halogen-hydrins, preferably ethylene-chlorohydrin, at an elevated temperature. It is of advantage to heat the reaction mixture to 100–150° C. It is suitable but not absolutely necessary to use a solvent. If desired, alcohols such as ethanol or butanol, aromatic hydrocarbons such as toluene or likewise ethers showing a raised boiling point may be used. The addition of an inorganic or organic basic compound, for instance an alkali metal carbonate, calcium oxide or dimethylaniline is of advantage in order to bind the hydrohalic acid set free during the reaction. For isolating the products, the reaction mixture is treated with dilute aqueous alkalis and an appropriate organic solvent such as ether or methylene chloride. After elimination of the solvent by evaporation the products of the invention are obtained in the form of the free bases, which is desired, may be converted in the usual manner by treatment with inorganic or organic acids, favorably in the presence of an organic solvent, into the corresponding acid addition salts. As solvents, there are used for the purpose in question alcohols such as ethanol or methanol, ethers such as diethyl ether or likewise acetone.

Instead of reacting the primary amines with ethylene-halogen-hydrins, their conversion into diethanolamines can likewise be carried out by reacting them, in a simple manner, with ethylene oxide. When operating in this way, the reaction is advantageously carried out in the presence of organic solvents in a closed vessel at an elevated temperature, preferably between 80 and 160° C. As solvents there are used, for example, alcohols and ethers, preferably, however, aromatic hydrocarbons such as benzene or toluene.

The tertiary diethanolamines thus obtained are viscous yellow oils which can be distilled only with decomposition, or they are crystalline substances. With inorganic or organic acids they form salts a part of which are obtained in crystalline form. As inorganic acids there may be mentioned, for example, hydrochloric acid, hydrobromic acid, hydroiodic acid, sulfuric acid, phosphoric acid or amidosulfonic acid. As organic acids there are mentioned, for example, acetic acid, tartaric acid, malic acid or ethylene-diamino-tetracetic acid.

The free tertiary diethanolamines may be converted into corresponding quaternary ammonium salts according to the invention. For this purpose, alkylation agents, such as reactive esters, are caused to act thereon, advantageously at elevated temperatures. For this purpose there are suitable, for instance, the esters of alcohols of the formula $R_4$—OH with hydrochloric, hydrobromic or hydroiodic acid, sulfuric acid or an aromatic or aliphatic sulfonic acid, particularly esters of lower alkylphenyl sulfonic acids such as p-toluene sulfonic acid or esters of a lower alkyl sulfonic acid, e.g., dimethyl sulfate. A solvent is not necessary but in most cases of advantage for obtaining good yields. There enters into consideration aromatic or aliphatic hydrocarbons, aliphatic esters, ethers, ketones, or alcohols, for instance, benzene, toluene, petroleum ether, ethyl acetate, diethyl ether, dioxane, tetrahydrofurane, acetone, methanol or ethanol. According to the reactivity of the alkylating agent used, less or more elevated temperatures are applied. Generally, the reaction proceeds in a sufficiently rapid way at the boiling temperature of the solvent. In certain cases it may, however, be suitable to perform the reaction at a temperature between 100 and 200° C. in an autoclave. When the reaction is terminated, the products are obtained directly in crystalline form or they may be crystallized by treatment with an appropriate solvent.

In most cases the quaternary ammonium salts form colorless crystals which are more or less soluble in water according to the nature of the substituents of the benzene nuclei and of the alkylating agent used. Most of them are easily soluble in low molecular aliphatic monohydric or polyhydric alcohols.

The tertiary amines obtained according to the process of the present invention as well as their salts and quaternisation products are non-toxic and possess valuable therapeutic properties, above all bacteriostatic, bactericidal, fungistatic and fungicidal properties. For example, the N-[γ,γ,γ-tri-(4'-chlorophenyl) - propyl] - N,N-bis-(β-hydroxyethyl)-N-methyl-ammonium-methyl-sulfate or the N-[γ,γ,γ-tri-(4'-chlorophenyl)-propyl] - diethanol-amino-hydrochloride, even if diluted in a ratio of 1–4γ/milliliter show a bacteriostatic action on gram-positive bacteria such as *Staphylococcus aureus, Streptococcus haemolyticus* or *Corynebacterium diphtheriae*. As to gram-negative bacteria such as *E. coli* or *Pseudomonas aeruginosa*, the lowest concentration of bacteriostatic activity of the N-[γ,γ,γ-tri-(4'-chlorophenyl)-propyl]-N,N-bis-(β-hydroxy-(ethyl)-N-methyl-ammonium-methyl-sulfate is at 15γ/milliliter.

As regards the bacteriological action of the products of the invention, the phenol coefficient of the N-[γ,γ,γ-tri-(4'-chlorophenyl)-propyl]-N,N-bis- (β-hydroxy-ethyl)-N-methyl-ammonium-methyl-sulfate, which coefficient represents in general a measuring unit of the bactericidal activity of a substance, amounts to about 400 with a view to staphylococci and to 200 with a view to *E. coli* and *Bacterium typhi*. The phenol coefficient of the N-[γ,γ,γ-tri-(4'-chlorophenyl)-propyl] - diethanolamine-hydrochloride with regard to staphylococci is comprised between 400 and 800. Owing to these properties, the new compounds can be used, for instance, as disinfectants in various fields of application.

The fungistatic activity of the products according to the invention is likewise important. For example, the growth of pathogenic yeasts such as *Candida albicans* or apathogenic fungi such as *Penicillium glaucum*, is inhibited by the N-[γ,γ,γ-tri-(4'-chlorophenyl)-propyl]-N,N-bis-(β-hydroxyethyl) - N-methyl-ammonium-methyl-sulfate even if the latter is applied in a concentration of 50 γ/milliliter. With a view to dermatophytes pathogenic to humans, such as *Microsporum gypseum*, Epidermophyton and Trichophyton, the fungistatic activity of the N-[γ,γ,γ-tri-(4'- chlorophenyl) - propyl]-diethanolamine-hydrochloride is within a concentration of 8 and 16 γ/milliliter, whereas the lowest concentration of fungistatic activity of the N-[γ,γ,γ-tri-(4'-chlorophenyl)-propyl]-N,N-bis-(β-hydroxy-ethyl) - N-methylammonium-methyl-sulfate is at 30γ/milliliter.

The bactericidal activity of the new compounds was ascertained by the Rideal-Walker test. The bacteriostatic efficiency was determined according to the known method of Wright (The Lancet, 1912) by the series dilution test according to the nature of germs used in bouillon or in serum bouillon as culture medium with small seed. The data were obtained by inspection of the turbidity of the test solution after an incubation period of 18 to 20 hours at 37° C.

The fungistatic activity of the compounds was tested by applying the series dilution test according to the method described by Schraufstätter, Richter and Dittscheid in "Archiv für Dermatologie und Syphilis," volume 188 (1949), page 259.

In addition to their activity on a great number of bacteria, dermatophytes, pathogenic yeasts and apathogenic fungi, most of the compounds are valuable intermediate products in the production of medicaments.

The products obtained according to the process of the invention may be used as such or in the form of galenic preparations, for instance as jellies, powders, ointments, pastes, mixtures to be shaken, tinctures, solutions, suspensions or tablets with admixture of non-toxic, pharmaceutically usual organic or inorganic carrier substances. For the preparation of said galenicals substances are used that do not react with the new products according to the invention, for instance, water, gelatin, bolus, lactose, saccharose, dextrose, starch, magnesium stearate, talc, vegetable oils, benzyl alcohols, gum, polyethylene glycol, cholesterin, vaseline, zinc oxide, titanium dioxide and other usual carrier substances. The products of the invention and/or the corresponding galenicals may be sterilized and/or may contain adjuvants, for instance, stabilizers, buffers, wetting agents, emulsifiers or salts influencing the osmotic pressure. The galenicals are prepared according to usual methods.

The galenicals may contain the active substances, for instance in a concentration of 0.1 to 1%. In the form of a jelly, an average concentration of 0.5% of the active ingredients has proved to be of advantage. Tablets may contain 1 to 10 milligrams, preferably 2 to 5 milligrams, of the active substance.

The following examples serve to illustrate the invention but they are not intended to limit it thereto:

*Example 1.—N-[γ,γ,γ-tri-(4'chlorophenyl)-propyl]-N,N-bis-(β-hydroxy-ethyl)amine*

203 grams of γ,γ,γ-tri-(4'-chlorophenyl)-propylamine and 65 cc. of ethylene-oxide are dissolved in 600 cc. of benzene, and the mixture is heated in an autoclave for 5 hours to 120° C. After elimination of the solvent by distillation there are obtained 250 grams of crude N-[γ,γ,γ tri-(4'-chlorophenyl) - propyl] - N,N-bis-(β-hydroxy-ethyl)-amine in the form of a yellow, viscous oil which can be used directly for the preparation of salts or for the quaternisation. If the crude amine is dissolved in about double its quantity of diisopropyl ether and the batch is allowed to stand for a prolonged period or inoculated, crystallization occurs and the N-[γ,γ,γ-tri-(4'-chlorophenyl)-propyl]-N,N-bis - (β-hydroxy-ethyl)-amine is obtained as a colorless crystalline powder melting at 109–110° C.

On adding a small excessive amount of alcoholic hydrochloric acid to an ethereal solution of the amine, the corresponding hydrochloric of the compound is obtained which, after recrystallization from alcohol/diisopropyl ether melts at 208–210° C.

*Example 2.—N-[γ,γ,γ-tri-(4'chlorophenyl)-propyl]-N,N-bis-(β-hydroxy-ethyl)-amine*

A mixture of 78 grams of γ,γ,γ-tri-(4'-chlorophenyl)-propylamine, 40 grams of ethylene-chlorohydrin and 12 grams of calcium oxide are heated while stirring for 20 hours to 110° C. After cooling, the viscous mass is treated with chloroform and dilute sodium hydroxide solution, the chloroform layer is separated, washed with water, dried over magnesium sulfate and the solvent is evaporated. The residue is dissolved in 100 cc. of diisopropyl ether and inoculated. The N-[γ,γ,γ-tri-(4'-chlorophenyl)-propyl]-N,N-bis(β-hydroxy-ethyl)-amine slowly crystallizes and is filtered with suction. The product melts at 108–110° C. The yield amounts to 70 grams.

*Example 3. — N-[γ-(3'-fluorophenyl)-γ,γ-bis-(4''-chlorophenyl)-propyl]-N,N-bis-(β-hydroxy-ethyl)-amine*

109 grams of γ-(3'-fluorophenyl)-γ,γ-bis-(4''-chlorophenyl)-γ,γ-bis-(4''-chlorophenyl)-propyl-amine and 41 cc. of ethylene-oxide are dissolved in 300 cc. of benzene and the mixture is heated in the autoclave for 5 hours to 120° C. After evaporating the solvent the N-[γ-(3'-fluorophenyl)-γ,γ-bis - (4'' - chlorophenyl) - propyl] - N,N-bis-(β-hydroxy-ethyl)-amine remains in the form of a light brown, very viscous oil. The yield amounts to 130 grams.

Example 4.—N-[γ,γ,γ-tri-(4'-chlorophenyl)-propyl]-N,N-bis-(β-hydroxy-ethyl)-N-methyl-ammonium-methyl-sulfate 19 grams of N-[γ,γ,γ-tri-(4'-chlorophenyl)-propyl]-N,N-bis-(β-hydroxy-ethyl)-amine and 5.5 grams of dimethyl-sulfate are dissolved in 60 cc. of benzene, and the mixture is heated under reflux for 15 minutes on the steam bath. 60 cc. of diisopropyl ether are then added, whereby an oil is separated which crystallizes slowly while standing, rapidly on inoculation. After filtering with suction there are obtained 20 grams of N-[γ,γ,γ-tri-(4'-chlorophenyl)-propyl] - N,N - bis - (β-hydroxy-ethyl)-N-methyl-ammonium-methyl-sulfate melting at 110–130° C. (with weak decomposition). The crude product may be recrystallized for purification, by dissolving it in 80 cc. of warm ethyl-acetate, adding 100 cc. of ether and inoculating it. The colorless crystals obtained melt at 111–113° C. with weak decomposition.

Example 5.—N-[γ,γ,γ-tri-(4'-chlorophenyl)-propyl]-N,N-bis-(β-hydroxy-ethyl)-N-allyl-ammonium bromide A solution of 24 grams of N-[γ,γ,γ-tri-(4'-chlorophenyl)-propyl]-N,N-bis-(β-hydroxy-ethyl)-amine and 7.2 grams of allyl-bromide in 50 cc. of alcohol is heated for 8 hours under reflux. After addition of 200 cc. of diisopropyl ether crystallization occurs and 17 grams of N - [γ,γ,γ - tri - (4' - chlorophenyl) - propyl] - N,N - bis-(β-hydroxy-ethyl)-N-allyl-ammonium bromide are obtained which can be recrystallized from alcohol/diisopropyl ether. The product forms colorless crystals which melt at 210–211° C. (with decomposition).

Example 6.—N-[γ-(3'-fluorophenyl)-γ,γ-bis-(4''-chlorophenyl)-propyl] - N,N - bis-(β-hydroxy-ethyl)-N-allyl-ammonium-bromide A solution of 23.1 grams of N-[γ-(3'-fluorophenyl)-γ,γ-bis-(4''-chlorophenyl)propyl] - N,N - bis-(β-hydroxy-ethyl)-amine and 7.2 grams of allyl bromide in 50 cc. of alcohol is heated for 7 hours under reflux. The solvent is completely evaporated and the residue is dissolved in 50 cc. of ethyl-acetate.

While standing, crystallization slowly occurs, which may be accelerated by inoculation. After addition of 50 cc. of diisopropyl ether the mixture is filtered with suction and 10 grams of N-[γ-(3'-fluorophenyl)-γ,γ-bis-(4''-chlorophenyl)-propyl] - N,N - bis - (β-hydroxy-ethyl)-N-allyl-ammonium-bromide are obtained showing a melting point of 190–193° C. By recrystallization from isopropanol/diisopropyl ether the salt may be further purified. It then melts at 193–194° C.

Example 7.—N-[γ,γ,γ-tri-(4'-chlorophenyl)-propyl]-N,N - bis - (β - hydroxy-ethyl) - N-ethyl-ammonium-p-toluene-sulfonate 24 grams of N-[γ,γ,γ-tri-(4'-chlorophenyl)-propyl]-N,N-bis-(β-hydroxy-ethyl)-amine and 12 grams of toluene-sulfonic acid ethyl ester are dissolved in 50 cc. of alcohol, and the solution is heated for 6 hours under reflux. Upon addition of 100 cc. of diisopropyl ether and suction filtering, there are obtained 26 grams of colorless N - [γ,γ,γ - tri - (4' - chlorophenyl) - propyl] - N,N - bis-(β - hydroxy - ethyl) - N - ethyl - ammonium - p - toluene-sulfonate melting at 157–158° C. The product can be recrystallized from isopropanol whereby the melting point is not influenced.

Example 8.—N-[γ,γ,γ-tri-(4'-chlorophenyl)-propyl]-N,N - bis - (β - hydroxy-ethyl) - N - (p - chlorobenzyl)-ammonium-chloride 19 grams of N-[γ,γ,γ-tri-(4'-chlorophenyl)-propyl]-N,N-bis-(β-hydroxy-ethyl)-amine are mixed with 7 grams of p-chlorobenzyl-chloride and the mixture is heated in the open flask for 8 hours on the steam bath. The mixture slowly thickens and finally solidifies to a hard crystalline mass. The product is dissolved in 450 cc. of boiling alcohol, filtered, 500 cc. of petroleum ether are added, and the solution is inoculated. The next day the mixture is filtered with suction and 10 grams of N-[γ,γ,γ-tri-(4'-chlorophenyl) - propyl] - N,N - bis - (β - hydroxy - ethyl)-N-(p-chlorobenzyl)-ammonium-chloride showing a melting point of 208–210° C. are obtained.

Example 9.—N-[γ,γ,γ-tri-(4-chlorophenyl)-propyl]-N,N-bis-(β-hydroxy-ethyl)ammonium chloride 19 grams of N-[γ,γ,γ-tri-(4-chlorophenyl)-propyl]-N,N - bis - (β - hydroxy - ethyl)-amine and 4.8 grams of ethylene-chlorohydrin are heated for 15 hours to 120–130° C. The melt is treated with a small amount of about 50 cc. of ethyl-acetate, whereby crystallization takes place. After filtering with suction there are obtained 10 grams of N-[γ,γ,γ-tri-(4-chlorophenyl)-propyl] - N,N,N,-tri-(β-hydroxy-ethyl)ammonium chloride of a melting point of 233–235° C. (with decomposition). The salt may be recrystallized from alcohol/diisopropyl ether, the melting point remaining the same.

We claim:
1. A compound selected from the group consisting of:
(1) diethanolamines of the formula

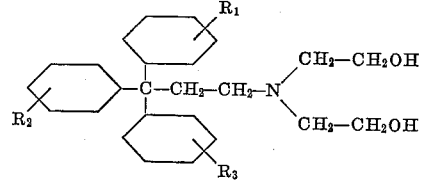

in which $R_1$ is a member selected from the group consisting of fluorine and chlorine, and $R_2$ and $R_3$ are each members selected from the group consisting of hydrogen, fluorine, and chlorine;
(2) non-toxic acid addition salts of said diethanolamines; and
(3) quaternization products of said diethanolamines of the formula

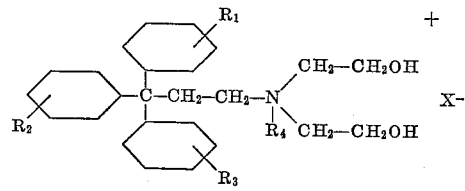

wherein $R_1$, $R_2$, and $R_3$ have the meanings given above, $R_4$ is a member selected from the group consisting of methyl, ethyl, hydroxy-ethyl, allyl, benzyl, and 4-chloro benzyl, and $X^-$ is a member selected from the group consisting of chloride, bromide, iodide, sulfate, lower alkyl sulfonate and lower alkylphenyl sulfonate.

2. N - [γ,γ,γ - tri - (4' - chlorophenyl) - propyl] - N,N-bis-(β-hydroxy-ethyl)-amine.

3. N - [γ - (3' - fluorophenyl) - γ,γ - bis - (4'' - chlorophenyl)-propyl]-N,N-bis-(β-hydroxyethyl)-amine.

4. N - [γ,γ,γ - tri - (4' - chlorophenyl) - propyl] - N,N-bis-(β-hydroxy-ethyl) - N - methyl - ammonium - methyl-sulfate.

5. N - [γ,γ,γ - tri - (4' - chlorophenyl) - propyl] - N,N-bis-(β-hydroxyethyl)-N-allyl-ammonium-bromide.

6. N - [γ,γ,γ - tri - (4 - chlorophenyl) - propyl] - N,N, N-tri-(β-hydroxyethyl)-ammonium-chloride.

References Cited

UNITED STATES PATENTS

| | | | |
|---|---|---|---|
| 2,229,024 | 1/1941 | Bruson | 260—567.6 X |
| 2,673,862 | 3/1954 | Krimmel | 260—386 |
| 2,676,987 | 4/1954 | Lewis et al. | 260—567.6 |

(Other references on following page)

| | | | |
|---|---|---|---|
| 2,759,975 | 8/1956 | Chiddix et al. | 260—567.6 |
| 2,894,033 | 7/1959 | Janssen et al. | 260—567.6 |
| 2,938,830 | 5/1960 | Davey et al. | 260—389 X |
| 3,047,461 | 7/1962 | Hardy et al. | 167—65 |
| 3,051,620 | 8/1962 | Abood | 167—65 |
| 3,057,881 | 10/1962 | Raschig et al. | 260—389 |

FOREIGN PATENTS

| | | |
|---|---|---|
| 214,426 | 4/1961 | Austria. |
| 566,930 | 12/1958 | Canada. |
| 1,088,972 | 9/1960 | Germany. |
| 627,139 | 7/1949 | Great Britain. |
| 875,955 | 8/1961 | Great Britain. |

OTHER REFERENCES

Hellerman et al.: J.A.C.S., vol. 68, pp. 819–825 (1946), QD1.A5.

CHARLES B. PARKER, *Primary Examiner.*

N. S. MILESTONE, F. D. HIGEL, *Assistant Examiners.*